(12) United States Patent
Nahm et al.

(10) Patent No.: US 9,637,663 B2
(45) Date of Patent: May 2, 2017

(54) PLASTICIZED UV/EB CURED COATINGS

(71) Applicant: Iconex LLC, Duluth, GA (US)

(72) Inventors: Steven Nahm, Morristown, TN (US); Larry G. Venable, Morristown, TN (US)

(73) Assignee: Iconex LLC, Duluth, GA (US)

( * ) Notice: Subject to any disclaimer, the term of this patent is extended or adjusted under 35 U.S.C. 154(b) by 413 days.

(21) Appl. No.: 13/930,393

(22) Filed: Jun. 28, 2013

(65) Prior Publication Data

US 2015/0004374 A1 Jan. 1, 2015

(51) Int. Cl.
| | |
|---|---|
| *C09D 183/06* | (2006.01) |
| *C09D 11/101* | (2014.01) |
| *C08K 5/00* | (2006.01) |
| *C08K 5/5435* | (2006.01) |
| *C08G 77/14* | (2006.01) |

(52) U.S. Cl.
CPC .......... *C09D 183/06* (2013.01); *C08K 5/0016* (2013.01); *C09D 11/101* (2013.01); *C08G 77/14* (2013.01); *C08K 5/5435* (2013.01); *C08L 2312/06* (2013.01); *Y10T 428/24802* (2015.01); *Y10T 428/31511* (2015.04)

(58) Field of Classification Search
CPC ............................................. Y10T 428/24802
See application file for complete search history.

(56) References Cited

U.S. PATENT DOCUMENTS

| | | | | |
|---|---|---|---|---|
| 5,932,352 | A * | 8/1999 | Higgins | ............... 428/423.1 |
| 6,001,473 | A * | 12/1999 | Atkinson et al. | ............ 428/352 |
| 6,492,433 | B1 * | 12/2002 | Eckberg | ................ C08F 2/50 |
| | | | | 522/148 |
| 2002/0090482 | A1 * | 7/2002 | Motomiya | ................ 428/41.6 |
| 2003/0083396 | A1 * | 5/2003 | Ylitalo et al. | ................ 522/74 |
| 2004/0132862 | A1 * | 7/2004 | Woudenberg | ............... 523/160 |
| 2005/0171237 | A1 * | 8/2005 | Patel et al. | ................ 523/160 |
| 2005/0237483 | A1 * | 10/2005 | Phelan | ............ B29D 11/00903 |
| | | | | 351/159.24 |
| 2008/0138634 | A1 * | 6/2008 | Morris | ............... C09D 5/1675 |
| | | | | 428/447 |
| 2009/0318578 | A1 * | 12/2009 | Versteeg | ............... C08G 59/36 |
| | | | | 522/31 |
| 2012/0077896 | A1 * | 3/2012 | Ishima | ............ 522/75 |

\* cited by examiner

*Primary Examiner* — Gerard Higgins
*Assistant Examiner* — Sathavaram I Reddy
(74) *Attorney, Agent, or Firm* — Schwegman Lundberg & Woesnner, P.A.

(57) ABSTRACT

A plasticized ultraviolet or electron beam (UV/EB) cationically cured coating, such as a release layer or print from UV/EB cured inks, comprises polymers with a reactive plasticizer incorporated therein. The cured coating contains the plasticizing additives permanently attached to the polymer matrix, locking them in place, and permanently flexibilizing the cured coating. The cured coating finds use on varied substrates including printable substrates used in conventional printers and those with release layers for adhesive labels. Coating formulations which form these cationically cured coatings comprise cationically polymerizable monomers and/or oligomers, a reactive plasticizer which is food grade, cosmetic grade, medical grade or biologically benign when incorporated in the polymer backbone, and a catalyst.

7 Claims, No Drawings

PLASTICIZED UV/EB CURED COATINGS

FIELD OF THE INVENTION

This invention relates to plasticized ultraviolet or electron beam (UV/EB) cured cationic coatings including release layers and print from UV/EB cured inks, substrates which contain such coatings and compositions which form these coatings.

BACKGROUND

In the manufacture of UV/EB cured coatings, there are many circumstances in which it is desirable to soften or plasticize the resulting coating to improve its resistance to delamination from a flexible surface. This is particularly true of UV/EB cured printing inks, where delamination can diminish the image quality and UV/EB cured silicone release layers, where lost portions from delamination can clog printer mechanisms, interfering with subsequent printing operations, or more importantly, can result in poor or no release from pressure sensitive adhesives.

Release layers, including silicone release layers, have long been used to protect the adhesive layers for tapes, labels, wall coverings, and other tacky substances. Cationic silicone release layers are commonly prepared from UV or EB curable compositions which can contain epoxy or vinyl ether functional siloxanes, including monomers, oligomers and/or polymers, and cationic photoinitiators that respond to UV light and/or an electron beam (EB). Discussions of epoxy functional siloxanes and cationic photoinitiators used to prepare silicone release layers are set forth in U.S. Pat. Nos. 4,279,717; 5,583,185; 5,500,300; 5,614,640; and 5,814,679; which are incorporated herein by reference for the disclosure of epoxy functional siloxanes cationic photoinitiators therein and the use thereof.

Ultraviolet light cured inks have found use in various printing processes. Most comprise a reactive monomer and/or oligomer, a photoinitiator, one or more a pigments and optional additives. Examples of cationically initiated ultraviolet light curable inks are described in U.S. Pat. Nos. 5,391,685, and 5,889,084, which are incorporated herein by reference for the ink formulations disclosed therein and use thereof.

Of the various types of UV/EB curable inks which are known, many find use in screen printing, overprint varnishes, flexographic printing and ink jet printing methods, examples being those described in U.S. Pat. No. 5,200,438, discussed above, as well as U.S. Pat. Nos. 5,391,685, 4,680,368 and 5,500,040.

Cationic photoinitiators generate strong acids on exposure to UV light or an electron beam (EB). The acids will initiate a chain reaction or polymerization of epoxy (oxirane), oxetane or vinyl ether functional groups.

UV/EB cured coatings, including release layers and print from UV/EB cured inks, can be very brittle, making them very susceptible to mechanical damage. Damage to release layers and print can occur during processing and handling. For example, damage to a release layer can occur in the slitting process in the manufacture of labels. This damage is believed to contribute to the buildup of the release layer and/or adhesive on printer print heads when thermal printable sheets with integral labels are used. In another example, damage to print (cracking) from UV/EB cured inks can occur during handling of the printed material.

The use of common inert plasticizers, such as adipic acid esters, phthalic acid esters, ricinoleate acid esters, citrates, epoxides, glycerols, glycols, hydrocarbons, chlorinated hydrocarbons, phosphates and the like, to make cationic silicone release layers or print from UV/EB cured inks less brittle can present problems. The inert plasticizers remain mobile in the release layer and print, which makes them subject to loss over time through migration or extraction. Migration or extraction of the plasticizer from the print can diminish the appearance of the printed image. Migration or extraction of the plasticizer from the release layers, including silicone release layers, will lead to embrittlement as they age and can lead to changes in the adhesive performance. This can range from increasing the adhesion of the adhesive to the point where a label will no longer release from the release layer, or deadening adhesion to the point where a label will no longer stick to the target substrate.

It is desirable to provide plasticized UV/EB cured cationic coatings, including release layers and print from UV/EB cured inks, which do not embrittle over time and are stable.

SUMMARY OF THE INVENTION

The present invention provides stable plasticized UV/EB cationically cured coatings including release layers and print from UV/EB cured inks. Also provided are substrates that contain these cured coatings and coating formulations that can form these coatings. These cationically cured coatings contain plasticizing additives which are permanently attached to the polymerized matrix, locking them in place, and permanently flexibilizing the cured coating. These plasticizing additives are unable to migrate out of the UV/EB cationically cured coatings. In addition to maintaining flexibility, the image/print quality from UV/EB cured inks will not be hampered by migrating plasticizers. Furthermore, the adhesion (tack) of any adhesive held in intimate contact with UV/EB cured release layers will not vary over time due to migrating plasticizing additives.

The coating compositions that form these coatings are comprised of UV/EB polymerizable monomers and/or oligomers selected from epoxy monomers and oligomers, oxetane monomers and oligomers, vinyl ether monomers and oligomers and combinations thereof known to undergo cationic polymerization. Also included are one or more cationic photoinitiators and one or more reactive plasticizers. Optional components for the UV/EB cured coating compositions include one or more photosensitizers for the cationic photoinitiator(s) and other additives known in the art, which improve or enhance application characteristics of the ink or coating.

Additional components for the UV/EB cured inks include one or more colorants selected from pigments and dyes. Optional components for the UV/EB cured inks include one or more performance additives such as pigment dispersants and defoamers and one or more propellants (volatile solvents) where the UV/EB cured ink is to be used in a thermal ink jet printer.

Optional components for the coating compositions that provide UV/EB cured release layers such as silicone release layers include one or more colorants selected from pigments and dyes, one or more performance additives such as pigment dispersants and defoamers.

Conventional epoxy monomers, oligomers and/or polymers, which a) have at least one oxirane moiety, b) can undergo cationic polymerization and c) have a viscosity suitable for use in conventional coating or printing processes, are preferred. The viscosity of the epoxy monomers, oligomers and/or polymers is preferably below about 25,000 cps at 25° C., in the absence of solvent, for use in such processes, more preferably below about 10,000 cps at 25° C., and most preferably below about 1,000 cps at 25° C.

Conventional oxetane monomers, oligomers and polymers, which a) have at least one oxetane group

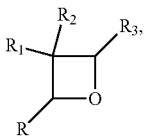

a 4-membered cyclic ether, comprised of one oxygen atom and 3 carbon atoms, which may have one or more non-hydrogen substituents R, $R_1$, $R_2$ and $R_3$ attached to the carbon atoms, wherein R, $R_1$, $R_2$ and $R_3$ are preferably H or $C_{1-8}$ alkyl with at least one of $R_1$ and $R_2$ being a non-hydrogen substituent, such as —$CH_2OH$ or —$CH_2CH_3OH$, b) have a viscosity suitable for use in conventional coating or printing processes and c) can undergo cationic polymerization, are suitable. The viscosity of the oxetane monomers, oligomers and/or polymers is preferably below 25,000 cps at 25° C., in the absence of solvent, for use in such processes, more preferably below about 10,000 cps at 25° C., and most preferably below about 1,000 cps at 25° C. Suitable oxetane monomers can be prepared by well-known methods such as by the reaction of potassium hydroxide with 3-chloropropyl acetate at 150 C described by C. R. Noller in "*Trimethylene Oxide*", *Org. Synth.* 29: 92; Coll. Vol. 3: 835(1955). Suitable hydroxyalkyl oxetane monomers are described by Subhankar Chatterjee in EP 1165708, entitled, "Radiation curable water based cationic inks and coatings."

Conventional vinyl ether monomers, oligomers and polymers, which a) have at least one vinyl ether group

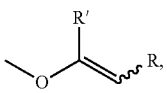

wherein R and R' are each, independently, H or $C_{1-8}$-alkyl, most preferably where both are H (a nonhydrogen R' is preferred to be $CH_3$), b) have a viscosity suitable for use in conventional coating or printing processes and c) can undergo cationic polymerization, are suitable. The viscosity of the vinyl ether monomers, oligomers and/or polymers is preferably below 25,000 cps at 25° C., in the absence of solvent, for use in such processes, more preferably below about 10,000 cps at 25° C., and most preferably below about 1,000 cps at 25° C.

Epoxy, oxetane and vinyl ether monomers and oligomers with two or more reactive groups can be used to increase crosslinking. Mixtures of epoxy, oxetane and vinyl ether monomers and oligomers may also be used, as well as monomers and oligomers containing mixtures of one or more of each type of functional group.

For UV/EB cationically curable release layers, suitable epoxy-functional monomers, oligomers and/or polymers are organohydrogensiloxanes or preferably diorganopolysiloxanes (most preferably dimethylsiloxanes), preferably having up to about 20%, more preferably having up to about 15%, and most preferably, having up to about 10% by weight aliphatic epoxide, cycloaliphatic epoxide or glycidyl ether groups, typically of from 2 to 20 carbon atoms, most preferably cycloaliphatic epoxide groups. These epoxy-functional siloxanes can be produced by a precious metal catalyzed hydrosilation reaction between a SiH-functional silane or siloxane and an olefin epoxide which contains both ethylenic unsaturation and epoxide functionality. Suitable hydrosilation reactions between olefin epoxides and organohydrogensiloxanes or diorganopolysiloxanes are described by Eckberg in U.S. Pat. Nos. 4,279,717 and 5,258,480. Examples of suitable olefin epoxides include 4-vinylcyclohexeneoxide, vinylnorbornene monoxide, dicyclopentadienemonoxide, allyl glycidyl ether and glycidyl acrylate. Alternately, suitable epoxy-functional poly diorganopolysiloxanes can be synthesized by condensation reactions between, for example, hydroxyl or alkoxy terminated silicone fluids and epoxy-functional alkoxy silanes of the type typically referred to as coupling agents. The epoxy-functional silicones obtained which have a viscosity of from about 50 centipoise to about 25,000 centipoise at 25° C. are suitable.

Commercially available epoxy-functional linear polydimethylsiloxane polymers developed for photocurable release coating applications are the SILCOLEASE® UV200 series available from Bluestar Silicones® of New Brunswick N.J., for example, UV POLY 200, UV POLY 205, UV POLY 206, UV POLY 215, and UV POLY 230.

Other commercially available epoxy-functional linear polydimethylsiloxane polymers developed for photocurable release coating applications include the SILFORCE® UV9300, SILFORCE® UV9315, SILFORCE® UV9400, and SILFORCE® UV9430 polymers available from MOMENTIVE® of Columbus Ohio. The SILFORCE® polymers can be blended with a conventional cationic photocatalyst, applied to substrates using standard coating techniques and rapidly crosslinked on exposure to ultraviolet light.

Other commercial sources of suitable epoxy functional polydimethylsiloxane monomers, oligomers and polymers are available from suppliers such as Cytek Industries, Evonik (Degusa), Gelest, Monomer-Polymer and Dajak Laboratories, among others.

For UV/EB cationically curable inks, suitable monomers, oligomers and/or polymers are generally comprised of structures in which atomic silicon is only present at a low molar percent or are completely free of atomic silicon, and have a reactive group functional equivalency of from 1 to about 6 or more, preferably 1 to about 3, such reactive functionality comprised of cycloaliphatic epoxy groups and/or oxetane groups (as defined above) and/or vinyl ether groups (as defined above).

Examples of preferred epoxies for UV/EB cationically curable inks include:

(1) monofunctional monomers/oligomers which contain cycloaliphatic epoxy reactive groups, cycloaliphatic monoepoxies, such as 4-ethyl-cyclohexene oxide, 4-propyl cyclohexene oxide, 4-vinylcyclohexene oxide (VCHO), and mixtures of cycloaliphatic monoepoxies available from Union Carbide under the trade name UVR 6100 having an epoxy equivalent weight of 130 to 140, 1-methyl-4-isopropenyl cyclohexene oxide (limonene oxide), dicyclopentadiene monoxide, 7-vinylnorborene monoxide, silicone epoxy oligomers, alpha pinene oxide, trimethylolpropane oxetane, alkyl vinyl ethers, cycloaliphatic vinyl ethers, aryl vinyl ethers and the like;

(2) bifunctional monomers such as limonene dioxide, cycloaliphatic diepoxides such as bis(3,4-epoxycyclohexyl) adipate and 3,4-epoxycyclohexylmethyl-3,4-epoxycyclohexane carboxylate (commercially available from Dow under the trade name Cyracure® 6110 and from Sartomer under the trade name Sarcat®), dicyclopentadiene dioxide, ethylene glycol divinyl ether, butanediol divinyl ether, cyclohexanediol divinyl ether and the like; and (3) polyfunctional monomers, which contain more than 2 cationic reactive groups and the like.

Specific examples of suitable monomers and oligomers for UV/EB cationically curable inks include vinylcyclohexene oxide, vinylcyclohexene dioxide, cyclohexene oxide, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, trimethylolpropane oxetane, ethylene glycol divinyl ether, butanediol divinyl ether and cyclohexanediol divinyl ether.

Examples of suitable commercially available UV/EB cationically curable epoxy monomers are UVACURE® 1550 resin (cycloaliphatic diepoxide), UVACURE® 1530 resin (hydroxy modified-cycloaliphatic diepoxide), UVACURE® 1533 resin (acrylic modified-cycloaliphatic diepoxide) and UVACURE® 1534 resin (hydroxy modified-cycloaliphatic di-epoxide), available from Cytec Industries Inc., Woodland Park, N.J.

For UV/EB cationically curable silicone release layers, suitable vinyl ether functional siloxane monomers, oligomers and/or polymers are of the formula:

(CHR=CR'—O—Z)$_n$-A, wherein A is a polysiloxane with from up to about 150 silicon atoms; n is an integer of 1 to about 10, Z is a direct bond or a divalent moiety having C$_{1-20}$ carbon atoms selected from the group consisting of alkylene, cycloalkylene, or polyalkylene ether moieties and R and R' are each, independently, H or C$_{1-8}$ alkyl. Examples of photopolymerizable organopolysiloxanes having a vinyl ether groups are described in U.S. Pat. No. 4,617,238 to Crivello, U.S. Pat. No. 4,707,503 to Itoh et al., U.S. Pat. No. 5,057,549 to Herzig et al., European Patent Publication No. 0462389, U.S. Pat. No. 5,039,716 to Vara et al., and U.S. Pat. No. 5,861,467 to Bujanowski et al.

For UV/EB cationically curable inks, suitable monomers, oligomers and/or polymers having at least one or more vinyl ether groups include those disclosed in U.S. Pat. No. 4,950,696 and those of the following general formula:

(CHR=CR'—O—Z)$_n$—B, wherein R, R', Z and n are as defined above and B is hydrogen or a moiety derived from mono-, di-, tri- or tetrafunctional aliphatic hydrocarbons, cycloaliphatic hydrocarbons, aromatic hydrocarbons, alcohols, esters, ethers, siloxanes, and carbonates, of from 1 to about 40 carbon atoms. In addition to inks, EP 0656016 B1 to Crivello et al. also discloses silicone-free release coatings obtained from UV cationically curable vinyl ethers.

Suitable vinyl ether functional aliphatic monomers can also be defined by the following formulae:

(CHR=CR'—O—(Z—O)$_m$)$_n$—B$_2$, wherein R, R' and n are as defined above, m is an integer of from 0 to about 5, Z is a divalent moiety having C$_{1-20}$ carbon atoms selected from the group consisting of alkylene, cycloalkylene, or polyalkylene ether moieties, and B$_2$ is hydrogen or a moiety derived from mono-, di-, tri- or tetra-functional aliphatic hydrocarbons or cycloaliphatic hydrocarbons.

Preferred mono—and difunctional aliphatic vinyl ether monomers include those based on normal alkanes, which have the general formula:

CHR=CR'—O—(CH$_2$)$_y$—B$_3$, wherein R and R' are as defined above, y is an integer of from 1 to about 18, and B$_3$ is hydrogen, —OH, or —O—CR'=CHR.

Preferred mono—and difunctional aliphatic vinyl ether monomers also include those based on ethylene glycols, which have the general formula:

CHR=CR'—(OCH$_2$CH$_2$)$_{y'}$—B$_3$, wherein R, R' and B$_3$ are as defined above and y' is an integer of from 1 to about 6.

Other preferred mono—and difunctional aliphatic vinyl ether monomers include those based on 1,2-propanediol (propylene glycol), which have the general formula:

CHR=CR'—(OCH(CH$_3$)CH$_2$)$_{y'}$—B$_3$ or

CHR=CR'—(OCH$_2$CH(CH$_3$))$_{y'}$—B$_3$, wherein R, R', B$_3$ and y' are as defined above and x is an integer which is 3 or 4.

Additional preferred mono—and difunctional aliphatic vinyl ether monomers include those based on 1,3-propanediol, 1,4-butanediol and 1,6-hexanediol, which have the general formula:

CHR=CR'—(O(CH$_2$)$_x$)$_{y'}$—B$_3$, wherein R, R', B$_3$ and y' are as defined above and x is an integer which is 3, 4 or 6.

Suitable vinyl ether functional monomers include those based on esters, which have the general formula:

(CHR=CR'—O—Z—O—C(O))$_n$—B$_4$, wherein R, R', Z and n are as defined above and B$_4$ is a mono-, di-, tri-, or tetrafunctional moiety having from 1 to about 16 carbon atoms selected from the group consisting of alkylene, cycloalkylene, arylene and aralkylene moieties.

Suitable vinyl ether terminated monomers include those based on ether monomers, which have the general formula:

CHR=CR'—O—[CH$_2$CH$_2$O]$_m$—B$_5$, wherein R and R' are as defined above, m is an integer of 2 to about 5 and B$_5$ is hydrogen, or —CR'=CHR.

Suitable vinyl ether terminated aromatic monomers include those which have the general formula:

(CHR=CR'—O—Z—O)$_n$—B$_6$, wherein R, R', Z and n as defined above, and B$_6$ is a mono-, di-, tri- or tetra-functional aromatic moiety having 6 to about 40 carbon atoms.

Suitable vinyl ether terminated carbonate monomers include those which have the general formula:

(CHR=CR'—O—Z—O)$_n$—(O—C(O)—O)$_p$—B$_7$, wherein R, R', Z and n as defined above, p is an integer of from 0 to 3 and B$_7$ is a diester, diol or polyol moiety of from 2 to about 20 carbon atoms.

Specific vinyl ethers which are suitable for UV/EB cationically curable inks include ethyl vinyl ether, propyl vinyl ether, isobutyl vinyl ether, octadecyl vinyl ether, hydroxybutyl vinyl ether, 4-(hydroxymethyl)cyclohexyl methyl vinyl ether, 2-methoxy ethyl vinyl ether, propenyl ether of propylene carbonate, dodecyl vinyl ether, cyclohexyl vinyl ether, 2-ethylhexyl vinyl ether, n-butyl vinyl ether, tert-butyl vinyl ether, ethyleneglycol monovinyl ether, diethyleneglycol divinyl ether, butanediol monovinyl ether, butane diol divinyl ether, hexane diol divinyl ether, ethylene glycol butyl vinyl ether, triethyleneglycol divinyl ether, triethylene glycol methyl vinyl ether, cyclohexane dimethanol monovinyl ether, cyclohexane dimethanol divinyl ether, 2-ethylhexyl vinyl ether, poly-THF divinyl ether, CHR=CR—[O(CH$_2$)$_4$—O]$_n$—CR=CHR, pluriol-E-200-vinyl ether, CHR=CR—[OCH$_2$CH$_2$]$_n$—O—CR=CRH, and the like.

The plasticizing additives are selected from a class of plasticizers which possess one or more functional groups that can react as chain transfer groups or chain terminating groups for a cationically propagating chain end, i.e., preferably —OH (alcohol) or —COOH (carboxylic acid) groups, epoxy groups, oxetane groups, or vinyl ether groups positioned along the polymer backbone, preferably as branches or side chains, or at the chain ends of branched polymers, where the branches do not contain reactive groups so as to increase the free volume between polymer molecules, whether a silicone polymer backbone in the case of a silicone release layer or a nonsilicone backbone in the case of UV/EB cationically curable inks. Multiple functional groups are preferred to ensure the plasticizer is integrated into the polymer matrix during the rapid polymerization reaction and preferably attach to more than one polymer chain. Plasticizers bound this way will not "bleed out" or "bloom" because of their permanent chemical integration into the polymer matrix.

Preferably, the plasticizing additives are selected from natural or synthetic biologically benign (harmless if ingested: preferably food, medical or cosmetic grade) materials, which more preferably are materials generally recognized as safe (GRAS) by the FDA for inclusion in foods (direct contact), FDA approved as constituents in coatings and adhesives used in direct and indirect food contact, medical or cosmetic grade materials. Where the reactive plasticizer is highly reactive and completely incorporates fully into the polymer backbone, it is considered biologically benign in that state.

Examples of suitable reactive plasticizing additives include a) fatty acids, b) mono-, di- and triglycerides, which contain reactive alcohol groups, c) diols or polyols, d) diacids and their monoesters, e) low molecular weight polyesters (linear or branched) having one or more alcohol groups or one or more carboxylic acid groups present as side chains or end groups, and f) polyacrylate copolymers containing comonomers with free —OH and/or —COOH groups, such as hydroxy(m)ethyl acrylate, (meth)acrylic acid or maleic anhydride, etc. The reaction of the alcohol groups with the propagating cationic intermediates will typically form ether linkages and reaction of the carboxylic acid groups with the propagating cationic intermediates will typically form ester linkages.

Fatty acids and triglycerides derived from the following oils have been approved for use by the FDA as indirect food additives in polymeric coatings (See 21 CFR 175.300): beechnut, candlenut, castor, chinawood (tung), coconut, corn, cottonseed, fish (refined), hempseed, linseed, oiticica, perilla, poppy seed, pumpkin seed, safflower, sesame, soybean, sunflower, walnut and tall oil. Those fatty acids and triglycerides with free OH and/or COOH groups are suitable for use in this invention.

Also approved are esters of these fatty acids derived from butylene glycol, ethylene glycol, pentaerythritol, polyethylene glycol, polypropylene glycol, propylene glycol, sorbitol, trimethylol ethane and trimethylol propane. Esters with free —OH and/or —COOH groups are suitable for use in this invention.

The following acids have been approved for use by the FDA as indirect food additives in polymeric coatings (See 21 CFR 175.300) and are suitable for use in this invention: adipic acid, 1,4-cyclohexanedicarboxylic acid, dimerized fatty acids derived from the oils identified above, fumaric acid, maleic acid, isophthalic acid, 2,6-naphthalenedicarboxylic acid, orthophthalic acid, sebacic acid, terephthalic acid and trimellitic acid.

The following acids and esters have been categorized by the FDA as Generally Recognized as Safe (GRAS) as direct food additives and are suitable for use in this invention: aconitic acid, agamic acid, benzoic acid, caprylic acid, citric acid, lactic acid, linoleic acid, malic acid, propionic acid, stearic acid, succinic acid, tannic acid, tartaric acid, and diacetyl tartaric acid of mono- and diglycerides.

The following alcohols have been approved for use by the FDA as indirect food additives in polymeric coatings (See 21 CFR 175.300) and are suitable for use in this invention: butylene glycol, diethylene glycol, ethylene glycol, glycerol, mannitol, [alpha]-methyl glucoside, pentaerythritol, propylene glycol, sorbitol, trimethylol ethane, trimethylol propane, cetyl alcohol, decyl alcohol, lauryl alcohol, myristyl alcohol, octyl alcohol and stearyl alcohol.

The following plasticizers approved for use by the FDA as indirect food additives in polymeric coatings (See 21 CFR 175.300) are suitable for use in this invention: propylene glycol, triethylene glycol, dipropylene glycol, mannitol, sorbitol, p-tert-butyl phenyl salicylate, epoxidized soybean oil, glyceryl monooleate, monoisopropyl citrate, mono-, di-, and tristearyl citrate, triethyl citrate, 3-(2-xenolyl)-1,2-epoxypropane, dihydroxy dichlorodiphenyl methane, glycerol and tributyl citrate.

The following plasticizers have been approved for use by the FDA as indirect food additives in polymeric coatings (See 21 CFR 175.300) but require modification to provide a free —OH and/or —COOH group for use in this invention: acetyl tributyl citrate, acetyl triethyl citrate, butylphthalyl butyl glycolate, butyl stearate, dibutyl sebacate, diethyl phthalate, diisobutyl adipate, diisooctyl phthalate, ethyl phthalyl ethyl glycolate, glycerol triacetate, di-2-ethylhexyl phthalate, triethylene glycol di-caprylic acid, 1,4-benzene dicarboxylic acid bis(2-ethyl hexyl) ester, and 1,2-benzenedicarboxylic acid dinonyl ester, dibutyl phthalate, cyclohexyl phthalate, diethylene glycol dibenzoate, dipropylene glycol dibenzoate, dibutyl sebacate, diheptyl adipate, dioctyl adipate, and dinonyl adipate.

Although not preferred, the reactive plasticizers may have anhydride, amide, imide, urethane, beta-dicarbonyl or thiol groups in addition to or instead of one or more alcohol groups or one or more carboxylic acid groups. These groups are also reactive with the propagating carbonium ion of cationically polymerizable functional groups and can form ester, thioether or N—C linkages with the polymer backbone. With the exception of the anhydride group, all materials with Pk$_a$s (acidity constants) less than about 16 can be considered potential reactive plasticizers.

Examples of fatty acids which possess functional groups (preferably two or more) that can react as chain transfer groups or chain terminating groups for a cationically propagating chain end include derivatives of natural unsaturated fatty acids such as palmitic, linolenic, oleic, linoleic acids, dimer acids, and tall oil fatty acids with preferably two or more functional groups and derivatives of saturated fatty acids, such as myristic acid, stearic acid, capric acid and lauric acid with preferably two or more functional groups. Examples include fatty acids (saturated or unsaturated) that have been reacted with multifunctional alcohols such as glycerol, ethylene glycol or propylene glycol to form glycerides and glycols with reactive alcohol groups.

Also suitable are mono-, di- and triglycerides or esters (benzoates, citrates, and phthalates), which contain reactive alcohol groups, formed from multifunctional alcohols (glycerol, ethylene glycol or propylene glycol, triethylene glycol, tetraethylene glycol) and acids such as benzoic acid, hexanoic acid, heptanoic acid, citric acid, cyclohexane dicarboxylic acid, phthalic acid, isophthalic and terephthalic acid.

Suitable diols include linear and branched aliphatic diols such as, for example, 2-methyl-1,3-propanediol and 2-methyl-2,4-propanediol; ethylene glycol; 1,2- and 1,3-propanediol; 1,2-, 1,3-, 1,4- and 2,3-butane-diol; 1,2-, 1,3-, 1,4- and 1,5-pentanediol; 1,6-hexanediol; 1,8-octanediol; 1,10-decanediol; diethylene glycol, triethylene glycol, tetraethylene glycol, dipropylene glycol, tripropylene glycol and neopentyl glycol; pentaerythritol; cyclohexanedimethanol; 2,2,4-trimethylpentane-1,3-diol. These can be used alone or in combination with other reactive plasticizers. Suitable cyclic aliphatic diols include 1,2-, 1,3-, 1,4-cyclohexane diols. Suitable aromatic diols include resorcinol and bisphenol-A.

Suitable polyols include glycerol, ethylene glycol, propylene glycol, pentaerythritol and resveratrol.

Suitable diacids and their monoesters include short chain aliphatic diacids ($C_2$-$C_{18}$) such as oxalic, malonic, succinic, glutaric, adipic, pimelic and suberic acid and long chain diacids ($C_9$-$C_{18}$) such as nonanedioic (azelaic), decanedioic (sebacic), and dodecanedioic acid.

Suitable diacids and their monoesters also include aromatic diacids such as phthalic acid, isophthalic acid, terephthalic acid and anhydrides such as phthalic anhydride and trimellitic anhydride.

Suitable low molecular weight polyesters (linear or branched) having one or more alcohol groups and/or one or more carboxylic acid groups present in side chains or as end groups can be prepared from reaction of dicarboxylic acids (or anhydrides) with diols and or polyols, such as those described above, and include sebacates, adipates, phthalates, terephthalates, dibenzoates, gluterates, azelates and citric acid.

Phthalate-, trimellitate-, adipate- sebacate- and maleate-based plasticizers having more than one alcohol group or one or more carboxylic acid group are also suitable.

Suitable reactive plasticizing molecules have reactive group equivalent weights up to about 600 Daltons, more suitable molecules have reactive group equivalent weights up to about 1,200 Daltons, and the most suitable molecules have reactive group equivalent weights up to about 2,500 Daltons.

Examples of commercially available low molecular weight polyester plasticizers, typically used in cosmetics (linear or branched) having one or more alcohol groups or one or more carboxylic acid groups which are suitable include the PELEMOL® polyesters available from Phoenix Chemical Inc. of Somerville, N.J. Specific examples include PELEMOL® P3D polyester (polypropanediol dimer dilinoleate, propane diol esterified with fatty acid dimers having an acid number of 35) and PELEMOL® DD polyester (dimer dilinoleyl dimer dilinoleate with a hydroxyl number between 40-60). Others include PELEMOL® 6G22 (polyglyceryl-6 behenate), PELEMOL® 6GPR (polyglyceryl-6 polyricinoleate), PELMOL® D9336 diisopropyl dimer dilinoleate and PELMO® D3GP (dimer dilinoeyl dimer dilinoleate (and) propanediol dicaprylate/caprate (and) polyglyceryl-3 behenate).

Besides being biologically benign and containing at least one reactive group that enables the plasticizing additive to react into the polymer backbone, the preferred plasticizing additive must also be soluble in the coating formulation as applied to the substrate prior to cure and preferably have a melting point below about 40° C. to facilitate blending into the liquid coating formulation.

To improve compatibility with coating formulations for silicone release layers, a silicone based plasticizer can be used. An example of such a plasticizer is SILFORCE® UV9440E polymer by MOMENTIVE® of Columbus Ohio SILFORCE® UV9440E is a polydimethyl silicone polymer with diol end groups having a hydroxyl equivalent weight of about 2,500 Daltons. Such plasticizers are preferably used with a coupling agent.

Such additives employed to plasticize the cationic inks and coatings are useful at relatively low levels. Typically, improvements are observed at between about 2 and about 15 weight percent on the total weight of the formulation, but will depend on the solubility, functional group density (equivalent weight) and type of functional groups present in the reactive plasticizers.

Suitable optional coupling agents have one functional group that participates in the cationic cure, such as an oxirane, oxetane or vinyl ether group and one or more functional groups that react with alcohol groups and/or carboxylic acid groups. These functional groups include alkoxyl groups, acetoxy groups, carboxyl groups, chlorosilane groups and silane ester groups.

Coupling agents of the type $R^1{}_n$—Si—$OR^2{}_{(4-n)}$ are particularly suitable where n is an integer from 1-3, preferably 2 and most preferably 1, R' contains a cationic-reactive group, particularly a cycloaliphatic epoxy, vinyl ether, or oxetane moiety, and $R^2$ is a hydrocarbon containing up to six carbon atoms, preferably with 4 or fewer carbon atoms, and more preferably with 2 or fewer carbon atoms.

Examples of suitable coupling agents include the epoxy silanes available from GELEST® Inc. of Morrisville, Pa. These include SIE 4666.0 epoxy silane, 2-(3,4-epoxycyclohexyl)ethylmethyldiethoxy silane, SIE 4668.0 (2-(3,4-epoxycyclohexyl)ethyltriethoxy silane), SIE 4670.0 (2-(3,4-epoxycyclohexyl)ethyltrimethoxy silane), and SIE 4675.0 (5,6-epoxyhexyl triethoxy silane).

Such additives employed to enhance the efficiency of the reactive plasticizers are useful at low levels. Typically, improvements are observed at between about 0.1 and about 2 weight percent on the total weight of the formulation, but will depend on the types of functional groups present in both the coating or ink formulation and the reactive plasticizer, the reactive group densities (equivalent weights) for each type of functional group present, the type of substrate the coating or ink is applied to, and the presence of water on/in the substrate surface, among other variables.

It is contemplated that intermediates to the coating formulations described above which comprise: a) one or more coupling agents of the formula: $R^1{}_n$—Si—$OR^2{}_{(4-n)}$ and b) the UV/EB cationically polymerizable monomers and/or oligomers described above, have utility without a reactive plasticizer present. Such intermediate coating formulations will aid the adhesion of the cured coating to the surface of a substrate with free oxide, OH and/or COOH groups, such as coated papers and anodized metals. The coupling agents integrate into the UV/EB cured polymer during cationic polymerization and also react with the active groups on the surface of the substrate. Although not wishing to be bound by theory, it is contemplated that some reaction between the coupling agent and the surface of the substrate occurs even where the reactive plasticizer is present within the coating formulations and cured coatings of the present invention.

Suitable photoinitiators include those compounds which form aprotic acids or Bronsted acids upon exposure to visible and/or UV light or EB radiation sufficient to initiate polymerization. These are distinguished from photoinitiators used to generate free radicals such as aromatic alpha-hydroxy ketone, aromatic phosphine oxide, and benzophenone classes of photoinitiator structures. Most cationic UV photoinitiators absorb photon energy at a wavelength in the range of 300-450 nm. The photoinitiator used may be a single compound, a mixture of two or more active compounds or a combination of two or more different compounds, i.e., co-initiators which form part of a multi-component initiating system.

The photoinitiator is preferably incorporated in an amount of from 0.01 to 10 wt. %, based on the total weight of the ink or coating formulation, most preferably about 2 to about 5 wt. % of the total ink or coating formulation. When the amount of photoinitiator is too low, cure is insufficient and where an excessive amount is used, rapid cure results in a decrease in cured molecular weight and reduced smear resistance.

Examples of suitable cationic photoinitiators are listed below:
Aryldiazonium salts of the formula: $Ar-N_2^+X^-$,
Diaryliodonium salts of the formula: $Ar_2-I^+X^-$,
Triarylsulphonium salts of the formulae $Ar_3-S^+X^-$, $Ar-S-Ar-S^+(Ar)_2X^-$, or $S-(Ar_3-S^+X^-)_2$,
Triaiylselenonium salts of the formula: $Ar_3-Se^+X^-$,
Dialkylphenacylsulphonium salts of the formula $Ar-C(O)-CH_2-S^+R_2X^-$,
Aryloxydiarylsulphoxonium salts of the formula $Ar_3-S^+(O)X^-$,
Dialylphenacylsulphoxonium salts of the formula $Ar-C(O)-CH_2(R)-S^+(O)-RX^-$,
wherein Ar is a phenyl or substituted phenyl group (one or more non-H substituents on the phenyl ring) or a naphthyl or substituted naphthyl group (one or more non-H substituents on the naphthyl rings), R is a $C_{1-10}$ hydrocarbon based moiety and X is a non-nucleophilic counter ion.

The counter ions are typically $SbF_6^-$, $AsF_6^-$, $PF_6^-$ and $BF_4^-$. Examples of suitable commercial photoinitiators are given below in Table 1.

TABLE 1

Suppliers of UV and visible light photoinitiators for cationic polymerizations.

| Type of Photoinitiator | Trade Name | Supplier |
|---|---|---|
| Triarylsulphonium salts | GARICURE ® PI 6990 | Guarson Chem. Co. Ltd |
| Mixed Triarylsulphonium salts | GARICURE ® PI 6992 | Guarson Chem. Co. Ltd |
| Triarylsulphonium salts | Degacure KI85 | Degussa |
| Triarylsulphonium salts | SP-55 | ADEKA |
| Triarylsulphonium salts | SP-150 | ADEKA |
| Triarylsulphonium salts | SP-170 | ADEKA |

Additionally, photosensitizers can be incorporated to improve the efficiency with which the photoinitiators use the energy delivered to the coated substrate, enabling increased line speeds or reduced power and facilitate proper coating cure. Useful photosensitizers include thioxanthones among other compounds well known and commercially available from numerous sources. Photosensitizers are typically used at about 5 to about 25 weight percent on the photoinitiator, but this rule of thumb can vary widely depending on the particular formulation, specific choice of photosensitizer and photoinitiator, energy transfer efficiencies between the photosensitizer and photoinitiator and coating thickness, to name but a few of the important variables.

It is critical that the ink or release coatings be sufficiently cured so as to limit migration of components (monomers, oligomers, polymers, plasticizers, etc.) therein. It is preferable that the coatings formed have less than about 4 wt. % extractables, based on the total weight of the coating, after exposure to a suitable solvent (acetone, isopropyl alcohol, toluene, hexane, etc.).

The photoinitiators are typically responsive to UV light (delivered by high pressure mercury lamps, xenon-lamps, arc lamps and gallium lamps in a conventional light array or light box) or electron beam (EB) irradiation.

The coating compositions may contain particulate fillers to enhance strength. The fillers must be of a size which does not scatter U.V. light and are preferably less than ½ the size at which they scatter light, so as not to interfere with penetration of the UV radiation and curing of the coating composition. Underivatized, and in some cases, surface modified fumed silica, is a preferred filler. Fumed silica particles are preferably less than 200 nanometers and more preferably are less than 20 nanometers in diameter. Suitable examples of particulate silicas include those available from Cabot Corporation, Cab-o-sil Division, Tuscola, Ill., under the trade name Cab-o-sperse®.

Preferred coating amounts which provide such layers with adequate release properties, in the case of release coatings, or color strength, in the case of inks, range from 0.01 to 10 g/m$^2$ (solids content) and more preferably range from 0.10 to 5.0 g/m$^2$ (solids content).

The cationic UV curable ink formulations of the present invention contain a coloring agent which is capable of being sensed visually, by optical means, by magnetic means, by electroconductive means or by photoelectric means. This coloring agent is typically a dye or pigment including a variety of organic and inorganic coloring pigments and dyes. Care needs to be exercised when selecting pigments, dyes, dispersants and surfactants, etc. for these cationic systems, as any component which has basic character—amine/amide/imide groups, salts with nonfugitive cations (sodium, potassium, quaternary ammonium counter ions, etc. for carboxylic, sulfonic, phosphonic acids, etc.) will poison/neutralize the active acid catalysts and inhibit or prevent cationic polymerization.

The total amount of coloring agent is typically from about 0.01-10 wt. % of the total ink formulation. Dispersing agents may optionally be used in the ink formulation to help disperse the pigments. Pigments are insoluble colorant particles and require dispersants to form stable dispersions. Dyes are soluble colorants, and will molecularly disperse or dissolve in the formulation to form a homogeneous solution.

The coating formulations which provide silicone release layers may also optionally have a coloring agent (dye or pigment), if desired.

Care is also necessary in selecting a substrate to ensure basic components are not exposed on the surface to cause inhibition of UV curing through neutralization of the active photocatalyst. The surface of the substrate may be subjected to the conventional surface treatments such as a chromic acid treatment, an ozone exposure, a flame exposure, a high pressure electric shock exposure, or an ionizing radiation treatment, in order to increase adhesion of the silicone release layer.

Where the silicone release layer is used to protect a pressure-sensitive adhesive, conventional pressure-sensitive adhesives can be used with no particular limitation. The pressure-sensitive adhesive can be applied to the face of a substrate opposite to that where the silicone release layer is formed as described in U.S. Pat. No. 7,618,685. The pressure sensitive adhesive will then contact the silicone release layer when the substrate is rolled onto itself. The pressure-sensitive adhesive layer may be applied to the substrate prior to forming the silicone release layer or alternatively, the silicone release layer can be formed prior to application of the pressure-sensitive adhesive layer.

The coating formulations of the present invention adhere well to various substrates such as coated and uncoated paper, wood, plastics, glass, ceramics and metal. The coating formulations of this invention can be applied to substrates by any conventional coating means, for example, by brushing, dipping, spray-coating, roller coating, offset, gravure, flexographic, lithography, ink jet, transfer roll coating or application with a reverse roll, dip roll, kiss roll, spray coater, air knife, bar coater or doctor blade, such as a Myer rod.

The viscosity of the coating formulations can be adjusted as necessary for the particular coating/printing method preferably by choosing reactive components that provide the desired liquid (for application) and cured (for end use) characteristics. Volatile solvents can be used to reduce viscosity but are not preferred. For example, ink jet inks typically have a viscosity in the range of 1-500 cps at 25° C., preferably 1-100 cps and most preferably between 1-25 cps. Flexographic inks typically have a viscosity in the range of about 35 cps to about 200 cps at 25° C. Inks used in gravure printing typically have a viscosity in the range of about of 25 cps to about 200 cps at 25° C. Inks used in lithography typically have a viscosity in the range of from about 100 cps to about 1100 cps.

Inks used in thermal ink jet printing typically contain a propellant (solvent), defoaming agents, flow adjusters, leveling agents or cobwebbing preventative agents to improve their properties as jet printing inks.

The coating formulations are typically cured by exposure to UV radiation, but they can also be cured by exposure to electron beam (EB) radiation. The purpose of the high energy irradiation is to generate the active acid catalyst from the photoinitiator, which initiates the cure reactions. Once the active (acid) catalyst is generated, the cure chemistry is subject to the same rules of thermodynamics as any chemical reaction—the reaction rate is accelerated by heat. Therefore, a "dark cure" can be used after activating the catalysts by exposure to UV/EB irradiation to increase the rate and extent of cure. This is accomplished by a subsequent heat treatment, such as by passing the substrate through an oven. The practice of using thermal treatments to enhance the cationic UV cure of monomers is generally known in the art. Examples of such techniques include those described by Crivello et al., "Dual Photo- and thermally initiated cationic polymerization of epoxy monomers," J. Polym. Sci. A Polym. Chem., Vol. 44, Issue: 23, pp. 6750-6764, (Dec. 1, 2006).

Exposing these coating formulations to UV light causes a rapid polymerization. The UV initiated reaction cures the coating formulation to a tack-free, smear-free layer in less than 1 minute directly on the substrate. In the preferred embodiments, the polymerization requires less than 1 second. The rate of the cure reaction depends on the amount of photocatalyst and specific coating resins present in the formulation, the coating thickness, pigmentation, dose rate and length of exposure. In general, however, lower power delivered to the substrate requires a longer exposure to affect cure.

The present invention also provides coated substrates where the coating is either a UV cured ink, a UV cured silicone release layer or both. Suitable substrates include cellulosic substrates (coated paper, uncoated paper, wood), textiles, fibers, metal (metal foils), glass, ceramics, and plastics (tapes, films such as polyethylene films, polypropylene films and polyester films). Preferred substrates include papers (SCK, OCR bond and glassine are examples), plastic films (polypropylene, polyethylene and polyesters are common examples) and metal foils.

Preferred coated substrates are linerless or self-wound labels, adhesive tapes, label sheets and duplex forms which have labels integrated therein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above or below, is hereby incorporated by reference.

EXPERIMENTAL EXAMPLES

Seven coating formulations were prepared with the epoxy-functional linear polydimethylsiloxane polymer formulation UV POLY 230 available from Bluestar Silicones® of New Brunswick N.J. This was a formulated release coating, containing an iodonium borate salt cationic photoinitiator at 2.5 wt %. The formulations had a viscosity in the range of 500-600 cps at 25° C. An unmodified formulation served as a control, while the other 6 formulations each included a different reactive plasticizer.

The coating formulations were run on a conventional printing press to print release layers for linerless labels at a coating-weight of 1.1±0.1 g/cm$^2$. The release coatings were printed over the topcoated thermally reactive coating of a direct thermal paper substrate (Kanzaki KL370NCR) and the pressure sensitive adhesive was applied to the reverse (uncoated) side of the web. The release coatings were cured upon exposure to 35-40 mJ/cm$^2$ UV radiation. Exposing each of the coating formulations to UV light caused a rapid polymerization, curing each to form a tack-free, smear-free layer in less than 1 second directly on the roll stock. About 20 days after printing, rolls of linerless labels were obtained after running the printed web through a slitter.

Of the seven formulations, five produced suitable linerless label stock which did not experience picking or blocking at the slitter, including the control UV230 without any reactive plasticizer. All experimental formulations improved the flexibility of the silicone release layer based on 1 mm Mandrel Bend testing observed under optical microscopy and all provided resilient layers that passed rub tests.

The five formulations which produced suitable label stock without picking or blocking at the slitter had the following reactive plasticizers in the amounts shown in Table 1:

1) none,
2) Pelmol P3D (Phoenix),
3) Pelmol DD (Phoenix),
4) UV9440E (Momentive) and
5) UV9440E (Momentive) and SIE4668.0 (Gelest).

TABLE 1

Additives Evaluated as Weight % Composition

| Example Number | Commercial UV230 | Phoenix Pelmol P3D | Phoenix Pelmol DD | Momentive UV9440E | Gelest SIE 4668.0 |
|---|---|---|---|---|---|
| 1 | 100% Bluestar UV230 Control | | | | |
| 3 | 95% (95.0%) | 5% (5.01%) | | | |
| 4 | 95% (95.0%) | | 5% (5.02%) | | |
| 2 | 95% (95.0%) | | | 5% (5.00%) | |
| 5 | 94.5% (94.3%) | | | 5% (5.15%) | 0.5% (0.54%) |

The values for weight % composition shown in the tables are target values. The actual values for weight % composition on press are shown in parenthesis.

Three cases (30 rolls/case, for a total of 90 rolls; each roll was 270 ft long, or 4.6 miles of receipts) of each linerless label stock formulation were sequentially printed in a thermal printer without periodic cleaning of the thermal printhead and evaluated for print defects, which are indicative of mechanical release coating damage. Defects were manifested by gaps in a specific region of the test receipt image printed by the thermal printer. Such gaps are primarily attributed to the buildup of residue on the thermal printhead, which acts as thermal insulation, reducing the ability of the printhead to activate the direct thermal coating. In addition to the number of gaps, the defects were further characterized by the size (width) of the gaps in the printed image. The data are based on a sampling rate of 1% of the simulated receipts printed (120 of 12,000 receipts printed per case). The results are summarized in Table 2 below.

TABLE 2

Print Defects

| Sample Tested | All Defects by Case - 30 Rolls | | | Total Defects by Size - 90 rolls | | | Comments |
|---|---|---|---|---|---|---|---|
| | Case 1 | Case 2 | Case 3 | 1/32"-1/16" | 1/16"-1/8" | >1/8" | |
| Example 1: | 32 | 47 | 90 | 54 | 114 | 1 | total defects per Case or size |
| Standard UV230 | 0.267 | 0.392 | 0.750 | 0.150 | 0.317 | 0.003 | % defects per Case or size |
| CONTROL | 266.7 | 391.7 | 750.0 | 150.0 | 316.7 | 2.8 | Defect rate/1000 per case or size |
| Example 2: | 49 | 67 | 65 | 78 | 101 | 2 | total defects per Run or size |
| 5% UV9440E | 0.408 | 0.558 | 0.542 | 0.217 | 0.281 | 0.006 | % defects per Run or size |
| | 408.3 | 558.3 | 541.7 | 216.7 | 280.6 | 5.6 | Defect rate/1000 per case or size |
| Example 3: | 0 | 12 | 15 | 24 | 3 | 0 | total defects per Run or size |
| 5% Pelmol P3D | 0.000 | 0.100 | 0.125 | 0.067 | 0.008 | 0.000 | % defects per Run or size |
| | 0.0 | 100.0 | 125.0 | 66.7 | 8.3 | 0.0 | Defect rate/1000 per case or size |
| Example 4: | 2 | 0 | 0 | 2 | 0 | 0 | total defects per run or size |
| 5% Pelmol DD | 0.017 | 0.000 | 0.000 | 0.006 | 0.000 | 0.000 | % defects per run or size |
| | 16.7 | 0.0 | 0.0 | 5.6 | 0.0 | 0.0 | Defect rate/1000 per case or size |
| Example 5: | 0 | 0 | 0 | 0 | 0 | 0 | total defects per run or size |
| Example 2 plus | 0.000 | 0.000 | 0.000 | 0.000 | 0.000 | 0.000 | % defects per run or size |
| 0.5% SIE 4668.8 | 0.0 | 0.0 | 0.0 | 0.0 | 0.0 | 0.0 | Defect rate/1000 per case or size |

The data in Table 2 shows significantly reduced print defects (less damage) by incorporation of 3 of the 4 reactive plasticizers that react into the polymer backbone of the release layer. The standard UV silicone (control) formulation had a total of 181 defects in 360 evaluated receipts, for a defect rate of 470/1000 receipts, whereas Example 3 had a total of 27 defects in 360 evaluated receipts, for a defect rate of 75/1000 and Example 4 had a total of 2 defects in 360 evaluated receipts, for a defect rate of 6/1000. The importance of the combined interactions between the reactive plasticizer, the cure chemistry and the substrate is demonstrated by comparing the results in Examples 2 and 5. Importantly, while the reactive plasticizer in Example 2 showed no improvement in the number of total defects, with a defect rate of 503/1000 receipts, when a coupling agent was added to the same formulation of reactive plasticizer and silicone, no defects occurred.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A coated substrate comprising a substrate and a plasticized ultraviolet or electron beam (UV/EB) cationically cured coating, wherein the plasticized ultraviolet or electron bean (UV/EB) cationically cured coating is comprised of polymers formed from:
   A. cationically polymerized monomers and/or oligomers, which are epoxy monomers, epoxy oligomers, oxetane monomers, oxetane oligomers, vinyl ether monomers, vinyl ether oligomers, or combinations thereof, and
   B. at least one reactive plasticizer which is permanently integrated within said plasticized ultraviolet or electron beam cationically cured coating, wherein the at least one reactive plasticizer possesses one or more functional groups that react as chain transfer groups or chain terminating groups with cationically polymerized monomers and/or oligomers, wherein the at least one reactive plasticizer is completely incorporated into the polymer backbone and is biologically benign in that state wherein the at least one reactive plasticizer is:
   A. polypropanediol dimer dilinoleate,
   B. dimer dilinoleyl dimer dilinoleate,
   C. polyglyceryl-6 behenate,
   D. polyglyceryl-6 polyricinaleate,
   E. diisopropyl dimer dilinoleate or a combination thereof.

2. A coated substrate comprising a substrate and a plasticized ultraviolet or electron beam (UV/EB) cationically cured coating, wherein the plasticized ultraviolet or electron bean (UV/EB) cationically cured coating is comprised of polymers formed from:
  A. cationically polymerized monomers and/or oligomers, which are epoxy monomers, epoxy oligomers, oxetane monomers, oxetane oligomers, vinyl ether monomers, vinyl ether oligomers, or combinations thereof, and
  B. at least one reactive plasticizer which is permanently integrated within said plasticized ultraviolet or electron beam cationically cured coating, wherein the at least one reactive plasticizer possesses one or more functional groups that react as chain transfer groups or chain terminating groups with cationically polymerized monomers and/or oligomers, wherein the at least one reactive plasticizer is completely incorporated into the polymer backbone and is biologically benign in that state, wherein the plasticized ultraviolet or electron beam (UV/EB) cationically cured coating additionally comprises at least one coupling agent having the formula $R^i{}_n\text{-Si}\text{—}OR^2{}_{(4-n)}$, where n is 2 and $R^1$ contains a cationic-reactive group which is a cycloaliphatic epoxy, vinyl ether, or oxetane moiety, and $R^2$ is an optionally substituted $C_{1-6}$ hydrocarbon, wherein said plasticized ultraviolet or electron beam cationically cured coating is a printed ink image cured by UV or EB radiation.

3. A UV/EB cationically curable coating formulation which comprises
  A. cationically polymerizable monomers and/or oligomers selected from epoxy monomers, epoxy oligomers, oxetane monomers, oxetane oligomers, vinyl ether monomers, vinyl ether oligomers, or combinations thereof, and
  B. at least one reactive plasticizer, wherein the at least one reactive plasticizer possesses two or more functional groups that react as chain transfer groups or chain terminating groups with the cationically polymerized monomers and/or oligomers, wherein the reactive plasticizer was
    completely incorporated into the polymer backbone and is biologically benign in that state,
  C. a cationic photoinitiator activated by UV/EB radiation and wherein the at least one reactive plasticizer is:
    A. polypropanediol dimer dilinoleate,
    B. dimer dilinoleyl dimer dilinoleate,
    C. polyglyceryl-6 behenate,
    D. polyglyceryl-6 polyricinoleate, or
    E. diisopropyl dimer dilinoleate.

4. The UV/EB cationically curable coating formulation of claim 3 which is an ink.

5. The UV/EB cationically curable coating formulation of claim 3 which forms a release layer for an adhesive label.

6. A UV/EB cationically curable coating formulation which comprises:
  A. cationically polymerizable monomers and/or oligomers selected from epoxy monomers, epoxy oligomers, oxetane monomers, oxetane oligomers, vinyl ether monomers, vinyl ether oligomers, or combinations thereof, and
  B. at least one reactive plasticizer, wherein the at least one reactive plasticizer possesses two or more functional groups that react as chain transfer groups or chain terminating groups with the cationically polymerized monomers and/or oligomers, wherein the reactive plasticizer was
    completely incorporated into the polymer backbone and is biologically benign in that state,
  C. a cationic photoinitiator activated by UV/EB radiation, wherein the at least one reactive plasticizer is a polydimethyl silicone polymer with diol end groups which completely incorporates in the polymer backbone and is biologically benign in that state, wherein the UV/EB cationically curable coating formulation additionally comprises at least one coupling agent having the formula $R^1{}_n\text{-Si}\text{—}OR^2{}_{(4-n)}$, where n is an integer of 1 or 2 $R^1$ contains a cationic-reactive group which is a cycloaliphatic epoxy, vinyl ether, or oxetane moiety, and $R^2$ is an optionally substituted $C_{1-6}$ hydrocarbon.

7. The UV/EB cationically curable coating formulation of claim 6 wherein the at least one coupling agent is
  A. 2-(3,4-epoxycyclohexyl)ethy lmethy ldiethoxy silane,
  B. 2-(3,4-epoxycyclohexyl)ethy ltriethoxy silane,
  C. 2-(3,4-epoxycyclohexyl)ethyltrimethoxy silane, or
  D. 5,6-epoxyhexyl triethoxy silane.

* * * * *

UNITED STATES PATENT AND TRADEMARK OFFICE
CERTIFICATE OF CORRECTION

PATENT NO. : 9,637,663 B2
APPLICATION NO. : 13/930393
DATED : May 2, 2017
INVENTOR(S) : Nahm et al.

Page 1 of 1

It is certified that error appears in the above-identified patent and that said Letters Patent is hereby corrected as shown below:

In the Claims

In Column 16, Line 63, in Claim 1, delete "polyricinaleate," and insert --polyricinoleate,-- therefor In Column 17, Line 20, in Claim 2, delete "$R^i_n$-Si-$OR^2_{(4-n)}$," and insert --$R^1_n$-Si-$OR^2_{(4-n)}$,-- therefor In Column 17, Line 27, in Claim 3, delete "comprises" and insert --comprises:-- therefor In Column 17, Line 38, in Claim 3, after "was", delete "¶"

In Column 18, Line 22, in Claim 6, after "was", delete "¶"

In Column 18, Line 27, in Claim 6, delete "silicone" and insert --silicon-- therefor In Column 18, Line 38-41, in Claim 7, delete "A. 2-(3,4-epoxycyclohexyl)ethy lmethy ldiethoxy silane,
B. 2-(3,4-epoxycyclohexyl)ethy ltriethoxy silane,
C. 2-(3,4-epoxycyclohexyl)ethyltrimethoxy silane, or
D. 5,6-epoxyhexyl triethoxy silane." and insert --A. 2-(3,4-epoxycyclohexyl)ethylmethyldiethoxysilane,
B. 2-(3,4-epoxycyclohexyl)ethyltriethoxysilane,
C. 2-(3,4-epoxycyclohexyl)ethyltrimethoxysilane, or
D. 5,6-epoxyhexyltriethoxysilane.-- therefor Signed and Sealed this
Twenty-third Day of June, 2020

Andrei Iancu
*Director of the United States Patent and Trademark Office*